Patented June 5, 1928.

1,672,378

UNITED STATES PATENT OFFICE.

ERICH FREUND, OF BERLIN, GERMANY, ASSIGNOR TO CHEMISCHE FABRIK AUF ACTIEN (VORM. E. SCHERING), OF BERLIN, GERMANY.

PRODUCTION OF UNSATURATED ORGANIC COMPOUNDS.

No Drawing. Application filed September 1, 1922, Serial No. 585,816, and in Germany September 22, 1921.

My invention relates to the catalytic production of unsaturated organic compounds from their corresponding hydroxyl compounds in a more efficient manner than was hitherto possible.

It is known that such production has been hitherto performed by means of aluminium-, thorium- or cerium oxides.

I have found that better results than are obtained by these substances can be obtained by other catalyzers which are characterized by chemical indifference as to the hydroxyl compounds in question and by a high degree of porosity, such as fuller's earth bleaching or siliceous clays, and other aluminum magnesium hydrosilicates, as for instance the products signified by the trade names, "Frankonites," "Tonsil" and the like. The dehydrating action of these catalyzers on hydroxyl compounds of the type

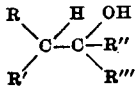

where the R, R', R'' and R''' signify any monovalent groups, can be explained as surface catalysis. The superiority over the catalyzers used up to the present may be shown as follows: According to Ipatiew (Berichte der deutschen chemischen Gesellschaft, volume 43, page 3383) the dehydration of cyclohexanol in presence of aluminium oxide requires a temperature of 400° C. and a hydrogen-pressure of 40 atmospheres. When any of the catalyzers above described is used, instead of the aluminium oxide, dehydration begins below the boiling point of cyclohexanol, and this substance is decomposed into water and cyclohexen.

The process may be illustrated by the following examples:

1. 100 parts of cyclohexanol and 2 parts of Frankonite are distilled from a retort, the temperature being so regulated, that only the constituents boiling below 90° C. are condensed. The distillate will then consist of a mixture of water and cyclohexene, which can easily be separated, yielding pure tetrahydrobenzene.

2. 100 parts of glycerine, desiccated at 180 degrees centigrade are distilled with 5 parts of infusorial silica. Pure acrolein will be obtained.

3. 100 parts of borneol are boiled with 5 parts of a bleaching clay consisting of aluminum magnesium hydrosilicate. A mixture of camphene and water will be condensed, from which camphene may be obtained by crystallization or rectification.

In an analogous way other unsaturated compounds can be obtained and other catalyzers of the described manner may be used.

I wish it to be understood that my invention is not confined to these examples and to the proportions described, for obvious modifications will occur to a person skilled in the art.

In the following claims, the expression "aliphatic system" is intended to include aliphatic chain systems as well as alicyclic ring systems.

I claim as my invention:

1. The method of producing unsaturated organic compounds, which comprises heating an organic compound which carries hydrogen and hydroxyl on two adjacent carbon atoms in an aliphatic system, with a bleaching earth as a catalyzer, and then separating the unsaturated compound thus formed.

2. The method of producing unsaturated organic compounds which comprises dehydrating organic compounds that carry hydrogen and hydroxyl on two adjacent carbon atoms in an aliphatic system, by the catalytic action of a bleaching earth and heat.

In testimony whereof I have hereunto set my signature.

DR. ERICH FREUND.